(12) United States Patent
Otaguro

(10) Patent No.: US 8,810,942 B2
(45) Date of Patent: Aug. 19, 2014

(54) MOTOR DRIVE DEVICE

(75) Inventor: Yoshito Otaguro, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 194 days.

(21) Appl. No.: 13/433,541

(22) Filed: Mar. 29, 2012

(65) Prior Publication Data
US 2013/0258515 A1  Oct. 3, 2013

(51) Int. Cl.
*G11B 27/10* (2006.01)
*H02P 6/14* (2006.01)

(52) U.S. Cl.
USPC ........................................ 360/51; 318/400.26

(58) Field of Classification Search
USPC ........... 360/55, 51, 77.02, 78.04; 318/400.26, 318/696, 685, 811, 599, 400.34
See application file for complete search history.

(56) References Cited

U.S. PATENT DOCUMENTS 5,625,269 A * 4/1997 Ikeda .......................... 318/696
6,903,894 B2 * 6/2005 Kokami et al. ............. 360/77.02

FOREIGN PATENT DOCUMENTS

JP  2006-311705  11/2006
JP  2007-074835  3/2007

* cited by examiner

*Primary Examiner* — Ali Neyzari
(74) *Attorney, Agent, or Firm* — Fish & Richardson P.C.

(57) ABSTRACT

A motor drive device has a driver circuit generating an output current for a motor and a control circuit controlling the drive circuit. The control circuit, when switching the driver circuit from a PWM-driving state to a linear-driving state, controls the timing of the switching such that the path of the output current does not change between before and after the switching, and in addition, in the middle of the switching, switches the driver circuit to a high-output-impedance state momentarily.

13 Claims, 7 Drawing Sheets

MOTOR DRIVE DEVICE

BACKGROUND OF THE INVENTION

1. Field of the Invention

The present invention relates to a motor drive device of hybrid type, a magnetic storage device and an electronic appliance that use the motor drive device.

2. Description of Related Art

In recent years, a motor drive device of hybrid type is proposed, which performs switching (a linear drive system→a PWM [pulse width modulation] drive system, and the PWM drive system→the linear drive system) of a motor drive system in accordance with the magnitude of an output current that flows in a motor.

Here, as an example of a conventional technology related to the above description, there are JP-A-2007-074835 (patent document 1) and JP-A-2006-311705 (patent document 2).

In the motor drive device of hybrid type, during its operation, the switching of the motor drive system invariably occurs. Therefore, if the switch timing (especially, the switch timing from the PWM drive system to the linear drive system) of the motor drive system is not considered, there is a problem that a glitch in an output current and a flow-through current to a power amplifier output stage occur to bring an unnecessary energy loss.

SUMMARY OF THE INVENTION

In light of the above problem found by the inventor of the present application, it is an object of the present invention to provide a motor drive device that is able to switch a motor drive system without bringing an unnecessary energy loss; a magnetic disk storage device and an electronic appliance that use the motor drive device.

To achieve the above object, a motor drive device disclosed in the present specification has a driver circuit that generates an output current for the motor; and a control circuit that controls the driver circuit; wherein the control circuit is structured so as to control timing of the switching such that a path of the output current does not change before and after the switching when switching the driver circuit from a PWM drive state to a linear drive state; and to switch temporarily the driver circuit to an output high impedance state during the switching.

According to a technology disclosed in the present specification, it is possible to provide a motor drive device that is able to switch a motor drive system without bringing an unnecessary energy loss; a magnetic disk storage device and an electronic appliance that use the motor drive device.

Here, other features, elements, steps, advantages and characteristics of the present invention will become more apparent from the following detailed description of preferred embodiments of the present invention and the attached drawings.

DETAILED DESCRIPTION OF PREFERRED EMBODIMENTS

<Motor Drive Device>

Figure 1:
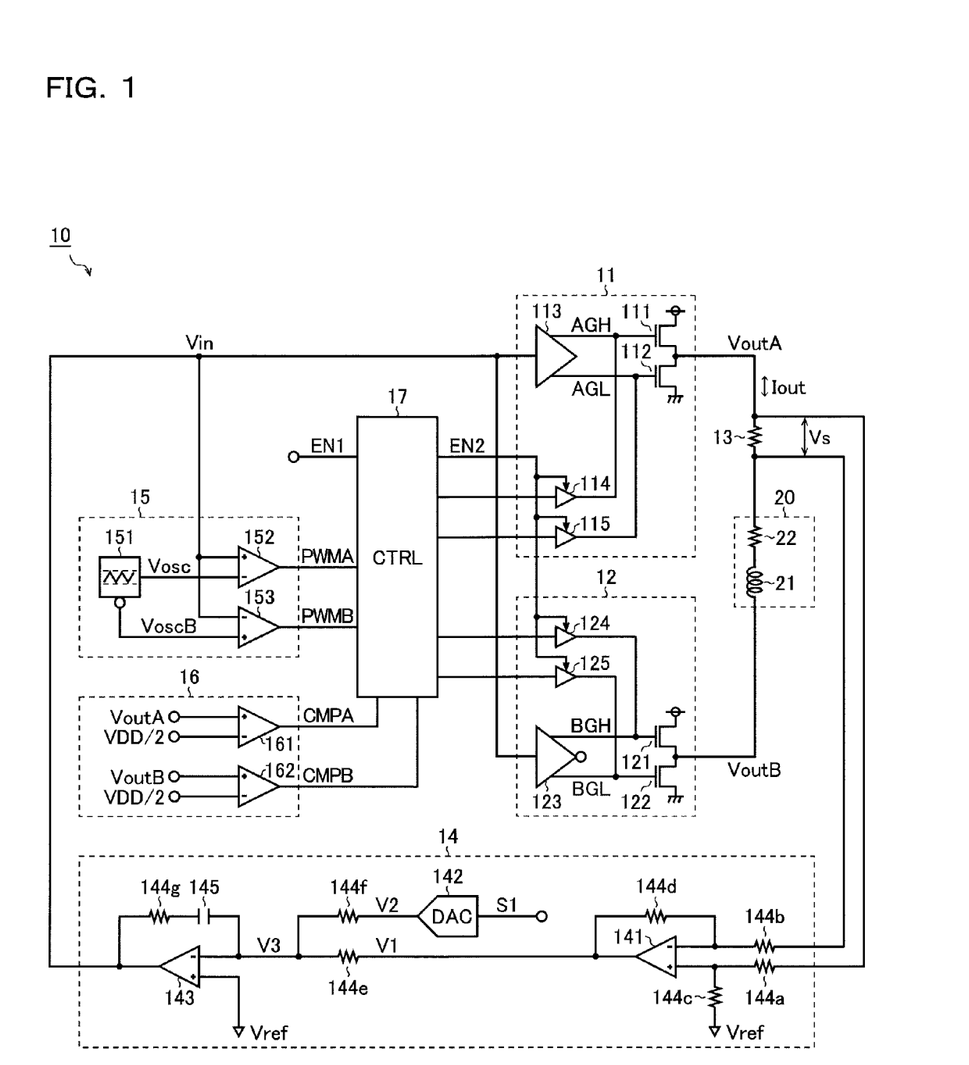
FIG. 1 is a block diagram showing a structural example of a motor drive device.

FIG. 1 is a block diagram showing a structural example of a motor drive device. A motor drive device 10 in the present structural example has: driver circuits 11 and 12; a sense resistor 13; an output feedback circuit 14; a PWM signal generation circuit 15; an output voltage monitor circuit 16; and a control circuit 17, and generates, based on a motor control signal S1 input from a not-shown master (microcomputer or the like), an output current Iout that flows in a motor 20.

The driver circuit 11, together with the driver circuit 12, generates the output current Iout for the motor 20. The driver circuit 11 includes: output transistors 111 and 112; a linear driver 113; and pre-drivers 114 and 115.

The output transistor 111 is an upper side switch element (NMOSFET [N-channel type metal oxide semiconductor field effect transistor]) that connects/disconnects a first terminal of the motor 20 and an application terminal of a power supply voltage VDD to and from each other. A drain of the output transistor 111 is connected to the application terminal of the power supply voltage VDD. A source of the output transistor 111 is connected to an application terminal of an output voltage VoutA. A gate of the output transistor 111 is connected to an application terminal of a gate voltage AGH. Here, as the output transistor 111, a PMOSFET may be used instead of the NMOSFET.

The output transistor 112 is a lower side switch element (NMOSFET) that connects/disconnects the first terminal of the motor 20 and an application terminal of a ground voltage GND to and from each other. A drain of the output transistor 112 is connected to the application terminal of the output voltage VoutA. A source of the output transistor 112 is connected to an application terminal of the ground voltage GND. A gate of the output transistor 112 is connected to an application terminal of a gate voltage AGL.

The linear driver 113 continuously changes the gate voltages AGH and AGL based on a feedback voltage Vin. More specifically, the linear driver 113 raises the gate voltage AGH higher and lowers the gate voltage AGL as the feedback voltage Vin becomes higher than a reference voltage Vref. To the contrary, the linear driver 113 drops the gate voltage AGH lower and raises the gate voltage AGL as the feedback voltage Vin becomes lower than the reference voltage Vref. Here, in an output stage of the linear driver 113, an AB-class power amplifier and the like are preferably usable.

When an internal enable signal EN2 is at a logic level (e.g., high level) during a PWM enable time, the pre-driver 114, based on an instruction from the control circuit 17, periodically changes the gate voltage AGH of the output transistor 111 to a high level (VoutA+Vreg) or a low level (VoutA) to apply PWM driving to the output transistor 111. On the other hand, when the internal enable signal EN2 is at a logic level (e.g., low level) during a PWM disable time, the pre-driver 114, goes to an output high impedance state irrespective of the instruction from the control circuit 17 not to discourage linear driving of the output transistor 111 and is disconnected from the gate of the output transistor 111.

When the internal enable signal EN2 is at the logic level (e.g., high level) during the PWM enable time, the pre-driver 115, based on an instruction from the control circuit 17, periodically changes the gate voltage AGL of the output transistor 112 to a high level (Vreg) or a low level (GND) to apply PWM driving to the output transistor 112. On the other hand, when the internal enable signal EN2 is at the logic level (e.g., low level) during the PWM disable time, the pre-driver 115, goes to an output high impedance state irrespective of the instruction from the control circuit 17 not to discourage linear driving of the output transistor 112 and is disconnected from the gate of the output transistor 112.

The driver circuit 12, together with the driver circuit 11, generates the output current Iout for the motor 20. The driver circuit 12 includes: output transistors 121 and 122; a linear driver 123; and pre-drivers 124 and 125.

The output transistor 121 is an upper side switch element (NMOSFET) that connects/disconnects a second terminal of the motor 20 and an application terminal of the power supply voltage VDD to and from each other. A drain of the output transistor 121 is connected to the application terminal of the power supply voltage VDD. A source of the output transistor 121 is connected to an application terminal of the output voltage VoutB. A gate of the output transistor 121 is connected to an application terminal of a gate voltage BGH. Here, as the output transistor 121, a PMOSFET may be used instead of the NMOSFET.

The output transistor 122 is a lower side switch element (NMOSFET) that connects/disconnects the second terminal of the motor 20 and an application terminal of the ground voltage GND to and from each other. A drain of the output transistor 122 is connected to the application terminal of the output voltage VoutB. A source of the output transistor 122 is connected to the application terminal of the ground voltage GND. A gate of the output transistor 122 is connected to an application terminal of a gate voltage BGL.

The linear driver 123 continuously changes the gate voltages BGH and BGL based on the feedback voltage Vin. However, the linear driver 123 has an output polarity inverse to the linear driver 113. More specifically, the linear driver 123 drops the gate voltage BGH lower and raises the gate voltage BGL as the feedback voltage Vin becomes higher than the reference voltage Vref. To the contrary, the linear driver 123 raises the gate voltage BGH higher and lowers the gate voltage BGL as the feedback voltage Vin becomes lower than the reference voltage Vref. Here, in an output stage of the linear driver 123, an AB-class power amplifier and the like are preferably usable.

When the internal enable signal EN2 is at the logic level (e.g., high level) during the PWM enable time, the pre-driver 124, based on an instruction from the control circuit 17, periodically changes the gate voltage BGH of the output transistor 121 to a high level (VoutB+Vreg) or a low level (VoutB) to apply PWM driving to the output transistor 121. On the other hand, when the internal enable signal EN2 is at the logic level (e.g., low level) during the PWM disable time, the pre-driver 124, goes to an output high impedance state irrespective of the instruction from the control circuit 17 not to discourage linear driving of the output transistor 121 and is disconnected from the gate of the output transistor 121.

When the internal enable signal EN2 is at the logic level (e.g., high level) during the PWM enable time, the pre-driver 125, based on an instruction from the control circuit 17, periodically changes the gate voltage BGL of the output transistor 122 to a high level (Vreg) or a low level (GND) to apply PWM driving to the output transistor 122. On the other hand, when the internal enable signal EN2 is at the logic level (e.g., low level) during the PWM disable time, the pre-driver 125, goes to an output high impedance state irrespective of the instruction from the control circuit 17 not to discourage linear driving of the output transistor 122 and is disconnected from the gate of the output transistor 122.

The sense resistor 13 (resistance value: Rs) is connected in series with the motor 20, and generates a voltage Vs ($=$Iout$\times$Rs) across both ends in accordance with the output current Iout.

The output feedback circuit 14 generates the feedback voltage Vin from the Vs (corresponding to a detection result of the output current Iout) across both ends of the sense resistor 13. As described above, the motor drive device 10 in the present structural example has the output feedback circuit 14 in a current mode for performing the feedback control of the output current Iout, accordingly, is able to control the micro-output current Iout with high accuracy. Here, the output feedback circuit 14 includes: a differential amplifier 141; a digital/analog converter 142; an error amplifier 143; resistors 144$a$ to 144$g$; and a capacitor 145.

A non-inverting input terminal (+) of the differential amplifier 141 is connected to a first terminal (node connected to the driver circuit 11) of the sense resistor 13 via the resistor 144$a$. An inverting input terminal (−) of the differential amplifier 141 is connected to a second terminal (node connected to the motor 20) of the sense resistor 13 via the resistor 144$b$. The resistor 144$c$ is connected across the non-inverting input terminal (+) of the differential amplifier 141 and the application terminal of the reference voltage Vref. The resistor 144$d$ is connected across the inverting input terminal (−) of the differential amplifier 141 and an output terminal of the differential amplifier 141. The output terminal of the differential amplifier 141 is connected to an inverting input terminal (−) of the error amplifier 143 via the resistor 144$e$ (resistance value: Rf). An input terminal of the digital/analog converter 142 is connected to an application terminal of the motor control signal S1. An output terminal of the digital/analog converter 142 is connected to an inverting input terminal (−) of the error amplifier 143 via the resistor 144$f$ (resistance value: Ri). A non-inverting input terminal (+) of the error amplifier 143 is connected to the application terminal of the reference voltage Vref. The resistor 144$g$ and the capacitor 145 are connected in series with each other across the inverting input terminal (−) of the error amplifier 143 and the output terminal of the error amplifier 143.

In the output feedback circuit 14 having the above structure, the differential amplifier 141 generates a voltage V1 by amplifying the voltage Vs across both ends of the sense resistor 13. The voltage V1 becomes a voltage signal that changes with respect to the reference voltage Vref.

The digital/analog converter 142 generates a voltage V2 from the motor control signal S1 (digital signal) input from outside.

The error amplifier 143 generates the feedback voltage Vin by amplifying a difference between a voltage V3 ($=$(Ri$\times$V1+Rf$\times$V2)/(Rf+Ri)) decided based on both of the voltage V1 and the voltage V2 and the predetermined reference voltage Vref. Here, in a case where the output current Iout flows from the driver circuit 11 to the driver circuit 12 via the motor 20, the feedback voltage Vin changes in a voltage range higher than the reference voltage Vref; to the contrary, in a case where the output current Iout flows from the driver circuit 12 to the driver circuit 11 via the motor 20, the feedback voltage Vin changes in a voltage range lower than the reference voltage Vref.

The PWM signal generation circuit 15 compares the feedback voltage Vin with each of a slope voltage Vosc and an inverted slope voltage VoscB, thereby generating a PWM signal PWMA and a PWM signal PWMB. The PWM signal generation circuit 15 includes an oscillator 151, comparators 152 and 153.

The oscillator 151 generates the triangular-wave or sawtooth slope voltage Vosc that has a predetermined frequency and the inverted slope voltage VoscB that is obtained by inverting the slope voltage Vosc.

The comparator 152 generates the PWM signal PWMA by comparing the feedback voltage Vin applied to a non-inverting input terminal (+) and the slope voltage Vosc applied to an inverting input terminal (−) with each other.

The comparator 153 generates the PWM signal PWMB by comparing the feedback voltage Vin applied to an inverting input terminal (−) and the inverted slope voltage VoscB applied to a non-inverting input terminal (+) with each other.

The output voltage monitor circuit 16 monitors output voltages VoutA and VoutB applied to the motor 20. The output voltage monitor circuit 16 includes comparators 161 and 162.

The comparator 161 generates a comparison signal CMPA by comparing the output voltage VoutA applied to a non-inverting input terminal (+) and a threshold voltage Vth (=VDD/2) applied to an inverting input terminal (−) with each other.

The comparator 162 generates a comparison signal CMPB by comparing the output voltage VoutB applied to a non-inverting input terminal (+) and the threshold voltage Vth (=VDD/2) applied to an inverting input terminal (−) with each other.

The control circuit 17 receives an external enable signal EN1, the PWM signals PWMA and PWMB, the comparison signals CMPA and CMPB to apply driving control (inclusive of generation of the internal enable signal EN2) to the driver circuits 11 and 12. Here, operation of the control circuit 17 is described in detail later.

The motor 20 is a drive target of the motor drive device 10 and driven by flowing the output current Iout into a coil 21. A resistor component 22 is connected in series with the coil 21. Here, as the motor 20, there are examples such as: a voice coil motor for moving a magnetic head of a hard disk drive in a radial direction of a platter; an actuator that is used for tracking serve control and focus servo control of an optical pickup; and the like.

FIG. 2A to FIG. 2D are each a view showing an example (case where the output current Iout flows from the driver circuit 11 to the driver circuit 12 via the motor 20) of a path in which the output current Iout flows. As shown in FIG. 2A to FIG. 2D, in the motor drive device 10 in the present structural example, the output transistors 111, 112 of the driver circuit 11 and the output transistors 121, 122 of the driver circuit 12 form output stages that are connected in an H-shaped bridge with respect to the motor 20.

Here, when the driver circuits 11 and 12 are under the PWM driving, the output current Iout flows via any one of paths A to C. Specifically, when the output transistors 111 and 122 are in an on state and the output transistors 112 and 121 are in an off state, the output current Iout flows via the path A (VDD→111→20→122→GND) shown in FIG. 2A. Besides, when the output transistors 111 and 121 are in the on state and the output transistors 112 and 122 are in the off state, the output current Iout (reflux current) flows via the path B (VDD→111→20→121→VDD) shown in FIG. 2B. Besides, when the output transistors 111 and 121 are in the off state and the output transistors 112 and 122 are in the on state, the output current Iout (discharge current) flows via the path C (GND→112→20→122→GND) shown in FIG. 2C.

Figure 2A:
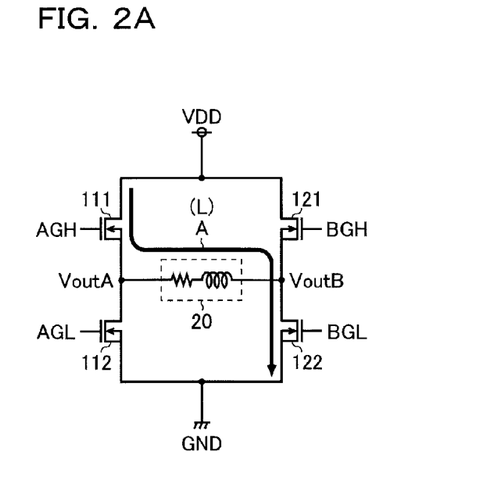
FIG. 2A is a view showing path examples (paths A and L) in which an output current Iout flows.
Figure 2B:
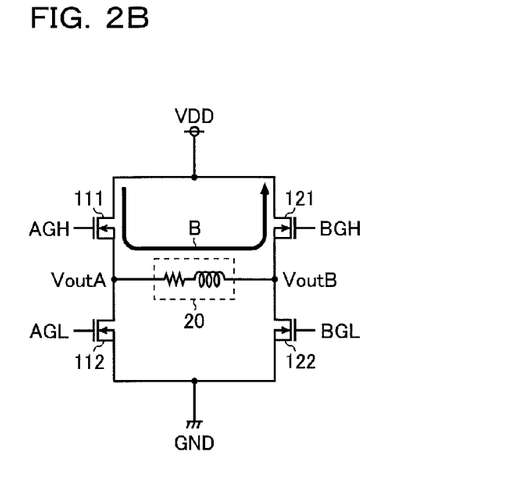
FIG. 2B is a view showing a path example (path B) in which the output current Iout flows.
Figure 2C:
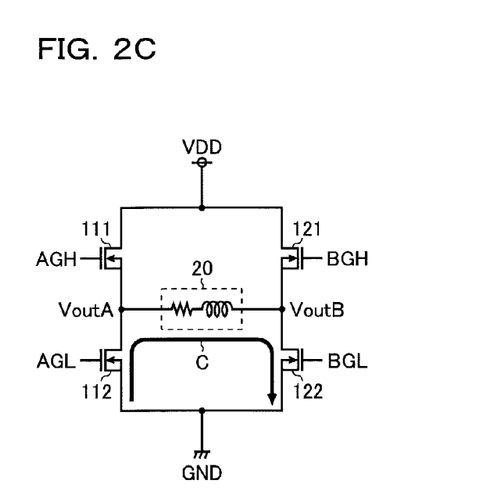
FIG. 2C is a view showing a path example (path C) in which the output current Iout flows.
Figure 2D:
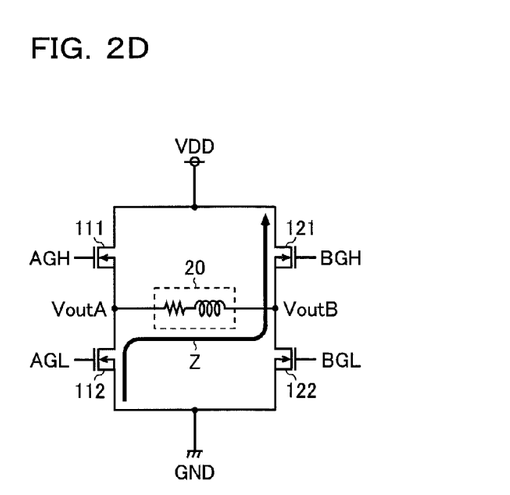
FIG. 2D is a view showing a path example (path Z) in which the output current Iout flows.

Besides, when all of the output transistors 111, 112, 121, and 122 are turned off and both of the driver circuits 11 and 12 are brought to an output high impedance state, the output current Iout (regenerative current) flows via the path Z (GND→112 (body diode)→20→121 (body diode)→VDD) shown in FIG. 2D.

On the other hand, in a case where the driver circuits 11 and 12 are changed from the above PWM drive state to a linear drive state, supposing that the motor control signal S1 does not change in digital value, the output current Iout flows from the application terminal of the power supply voltage VDD to the application terminal of the ground voltage GND via a path L that is the same as the path A.

Accordingly, to prevent a glitch in the output current Iout from occurring during the time of switching the motor drive system, it is conceivable important to perform control of the switch timing such that the path in which the output current Iout flows does not change before and after the switching when switching the driver circuits 11 and 12 from the PWM drive state to the linear drive state. Besides, during the time of switching the motor drive system, to prevent an unnecessary through-current from flowing in the driver circuits 11 and 12, it is conceivable effective to temporarily switch the driver circuits 11 and 12 to the output high impedance state during the time of switching the driver circuits 11 and 12 from the PWM drive state to the linear drive state. Hereinafter, the operation of switching the motor drive system, which is performed based on the study, is described specifically.

Figure 3:
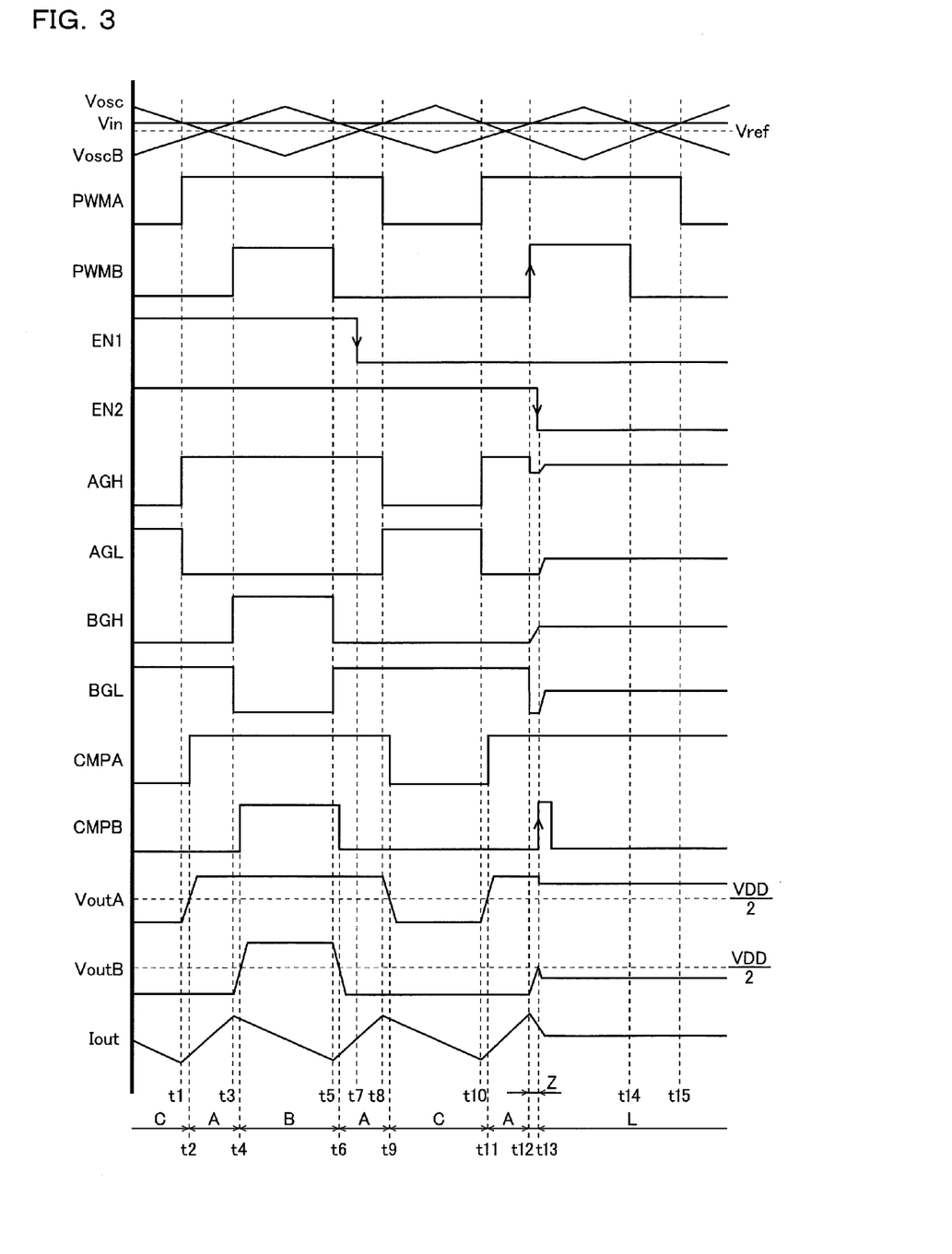
FIG. 3 is a timing chart for describing an operation of switching a motor drive system.

FIG. 3 is a timing chart for describing the operation of switching the motor drive system, which represents in an order from top: the slope voltage Vosc; the feedback voltage Vin; the inverted slope voltage VoscB; the PWM signals PWMA and PWMB; the external enable signal EN1; the internal enable signal EN2; the gate voltages AGH and AGL; the gate voltages BGH and BGL; the comparison signals CMPA and CMPB; the output voltages VoutA and VoutB; and the output current Iout. Here, in FIG. 3, it is supposed that the time passes in an order of times t1 to t15. Besides, in FIG. 3, behavior is represented as an example, in which the output current Iout flows from the driver circuit 11 to the driver circuit 12 via the motor 20.

First, the timing chart is described focusing on behavior of each element (voltage, current, signal) represented in FIG. 3.

The slope voltage Vosc and the inverted slope voltage VoscB have voltage waveforms that are inverse to each other with respect to the reference voltage Vref.

The PWM signal PWMA goes to a high level when the feedback voltage Vin is higher than the slope voltage Vosc (times t1 to t8 and times t10 to t15), and goes to a low level when the feedback voltage Vin is lower than the slope voltage Vosc (before time t1, times t8 to t10, and after time t15).

The PWM signal PWMB goes to the high level when the feedback voltage Vin is lower than the inverted slope voltage VoscB (times t3 to t5 and times t12 to t14), and goes to the low level when the feedback voltage Vin is higher than the inverted slope voltage VoscB (before time t3, times t5 to t12, and after time t14).

The external enable signal EN1 is input from a not-shown master (microcomputer and the like). When changing the driver circuits 11 and 12 to the PWM drive state, the external enable signal EN1 is brought to the high level; when changing the driver circuits 11 and 12 to the linear drive state, the external enable signal EN1 is brought to the low level. However, the control circuit 17 has a structure, in which when changing the driver circuits 11 and 12 from the PWM drive state to the linear drive state, the control circuit 17 changes the motor drive system (PWM→linear) not at a falling timing (time t7) of the external enable signal EN1 but at a falling timing (time t13) of the internal enable signal EN2 that is generated by the control circuit 17.

The internal enable signal EN2 is a switching signal that is generated by the control circuit 17 and changes the motor drive system. When the internal enable signal EN2 is at the high level, the pre-drivers (114, 115, 124, 125) go to an output enable state and the driver circuits 11 and 12 go to the PWM drive state. On the other hand, when the internal enable signal EN2 is at the low level, the pre-drivers (114, 115, 124, 125) go to an output disable state (output high impedance state) and the driver circuits 11 and 12 go to the linear drive state. Here, in FIG. 3, at a rising timing (time t13) of the comparison signal CMPB, the internal enable signal EN2 is dropped to the low level, a reason of which is described later.

When the driver circuit 11 is under the PWM driving (before time t12), the gate voltage AGH rises to the high level (VoutA+Vreg) at a rising timing of the PWM signal PWMA, and falls to the low level (VoutA) at a falling timing of the PWM signal PWMA. Besides, when the driver circuit 11 is in the output high impedance state (times t12 to t13), the gate voltage AGH is kept at the low level (VoutA). Besides, when the driver circuit 11 is under the linear driving (after t13), the gate voltage AGH is linear-driven in accordance with the feedback voltage Vin to become higher as the feedback voltage Vin becomes higher than the reference voltage Vref; to the contrary, the gate voltage AGH is linear-driven in accordance with the feedback voltage Vin to become lower as the feedback voltage Vin becomes lower than the reference voltage Vref.

When the driver circuit 11 is under the PWM driving (before time t12), the gate voltage AGL falls to the low level (GND) at a rising timing of the PWM signal PWMA, and rises to the high level (Vreg) at a falling timing of the PWM signal PWMA. Besides, when the driver circuit 11 is in the output high impedance state (times t12 to t13), the gate voltage AGL is kept at the low level (GND). Besides, when the driver circuit 11 is under the linear driving (after t13), the gate voltage AGL is linear-driven in accordance with the feedback voltage Vin to become lower as the feedback voltage Vin becomes higher than the reference voltage Vref; to the contrary, the gate voltage AGL is linear-driven in accordance with the feedback voltage Vin to become higher as the feedback voltage Vin becomes lower than the reference voltage Vref.

When the driver circuit 12 is under the PWM driving (before time t12), the gate voltage BGH rises to the high level (VoutB+Vreg) at a rising timing of the PWM signal PWMB, and falls to the low level (VoutB) at a falling timing of the PWM signal PWMB. Besides, when the driver circuit 12 is in the output high impedance state (times t12 to t13), the gate voltage BGH is kept at the low level (VoutB). Besides, when the driver circuit 12 is under the linear driving (after t13), the gate voltage BGH is linear-driven in accordance with the feedback voltage Vin to become lower as the feedback voltage Vin becomes higher than the reference voltage Vref; to the contrary, the gate voltage BGH is linear-driven in accordance with the feedback voltage Vin to become higher as the feedback voltage Vin becomes lower than the reference voltage Vref.

When the driver circuit 12 is under the PWM driving (before time t12), the gate voltage BGL falls to the low level (GND) at a rising timing of the PWM signal PWMB, and rises to the high level (Vreg) at a falling timing of the PWM signal PWMB. Besides, when the driver circuit 12 is in the output high impedance state (times t12 to t13), the gate voltage BGL is kept at the low level (GND). Besides, when the driver circuit 12 is under the linear driving (after t13), the gate voltage BGL is linear-driven in accordance with the feedback voltage Vin to become higher as the feedback voltage Vin becomes higher than the reference voltage Vref; to the contrary, the gate voltage BGL is linear-driven in accordance with the feedback voltage Vin to become lower as the feedback voltage Vin becomes lower than the reference voltage Vref.

The comparison signal CMPA goes to the high level (times t2 to t9, and after time t11) when the output voltage VoutA is higher than the threshold voltage Vth (=VDD/2), and goes to the low level (before time t2, and times t9 to t11) when the output voltage VoutA is lower than the threshold voltage Vth.

The comparison signal CMPB goes to the high level (times t4 to t6, and time t13) when the output voltage VoutB is higher than the threshold voltage Vth, and goes to the low level (before time t4, and times t6 to t13) when the output voltage VoutB is lower than the threshold voltage Vth.

When the driver circuits 11 and 12 are in the PWM drive state (before time t12), the output voltage VoutA has a voltage value in accordance with the on/off state of the output transistors 111 and 112. Besides, when the driver circuits 11 and 12 are switched from the PWM drive state to the output high impedance state (times t12 to t13), the output voltage VoutA is kept at substantially the power supply voltage VDD. Besides, when the driver circuits 11 and 12 are switched from the output high impedance state to the linear drive state (after time t13), the output voltage VoutA has a voltage value in accordance with a conducting degree of the output transistors (111, 112, 121, 122) (see FIG. 5 together).

When the driver circuits 11 and 12 are in the PWM drive state (before time t12), the output voltage VoutB has a voltage value in accordance with the on/off state of the output transistors 121 and 122. Besides, when the driver circuits 11 and 12 are switched from the PWM drive state to the output high impedance state (times t12 to t13), the output voltage VoutB rises in voltage value in accordance with the output voltage VoutA. Besides, when the driver circuits 11 and 12 are switched from the output high impedance state to the linear drive state (after time t13), the output voltage VoutB has a voltage value in accordance with the conducting degree of the output transistors (111, 112, 121, 122) (see FIG. 5 together).

When the driver circuits 11 and 12 are under the PWM driving (before time t12), the output current Iout flows via any one of the paths A to C (see FIG. 2A to FIG. 2C). Besides, when the driver circuits 11 and 12 are in the output high impedance state (times t12 to t13), the output current Iout flows via the path Z (see FIG. 2D). Besides, when the driver circuits 11 and 12 are under the linear driving (after time t13), the output current Iout flows via the path L that is the same as the path A (see FIG. 2A).

Next, the timing chart is described again focusing on operation of the control circuit 17.

The control circuit 17 applies the PWM driving to the driver circuits 11 and 12 until the time t12 based on the PWM signals PWMA and PWMB. At this time, the control circuit 17, based on the PWM signals PWMA and PWMB, controls the pre-drivers (114, 115, 124, 125) to switch the path in which the output current Iout flows.

Specifically, when the PWM signal PWMA is at the high level and the PWM signal PWMB is at the low level, the control circuit 17 controls the pre-drivers (114, 115, 124, 125) to flow the output current Iout via the path A (see FIG. 2A). On the other hand, when both of the PWM signals PWMA the PWM signal PWMB are at the high level, the control circuit 17 controls the pre-drivers (114, 115, 124, 125) to flow the output current Iout via the path B (see FIG. 2B). Besides, when both of the PWM signals PWMA the PWM signal PWMB are at the low level, the control circuit 17 controls the pre-drivers (114, 115, 124, 125) to flow the output current Iout via the path C (see FIG. 2C).

Here, when switching the driver circuits 11 and 12 from the PWM drive state to the linear drive state, the control circuit 17 controls the switch timing such that the path in which the output current Iout flows does not change before and after the switching, and controls the pre-drivers (114, 115, 124, 125) to temporarily switch the driver circuits 11 and 12 to the output high impedance state during the switching.

More specifically, the control circuit 17 controls the pre-drivers (114, 115, 124, 125) to switch the driver circuits 11 and 12 from the PWM drive state to the output high impedance state at the time point (time t12) when both of the PWM signals PWMA and PWMB go to the high level after the external enable signal EN1 is dropped to the low level. Here, when bringing the driver circuits 11 and 12 to the output high impedance state, the control circuit 17 controls the pre-drivers (114, 115, 124, 125) such that all of the output transistors (111, 112, 121, 122) are turned off.

Besides, the control circuit 17 confirms that all of the output transistors (111, 112, 121, 122) are turned off after the driver circuits 11 and 12 are switched from the PWM drive state to the output high impedance state; and switches the driver circuits 11 and 12 from the output high impedance state to the linear drive state.

At this time, the control circuit 17, based on the comparison signals CMPA and CMPB output from the output voltage monitor circuit 16, confirms that all of the output transistors (111, 112, 121, 122) are turned off. More specifically, the control circuit 17 drops the internal enable signal EN2 to the low level to switch the driver circuits 11 and 12 from the output high impedance state to the linear drive state at the time point (time t13) when both of the comparison signals CMPA and CMPB go to the high level after the driver circuits 11 and 12 are switched to the output high impedance state.

As described above, the motor drive device 10 in the present structural example is able to make the paths in which the output current Iout flows agree with each other before and after the switching of the motor drive system (A→L), accordingly, it becomes possible to smoothly performs the switching the motor drive system without allowing a glitch (and an unnecessary energy loss) in the output current Iout to occur.

Especially, according to the structure in which the driver circuits 11 and 12 are switched to the output high impedance state at the time t12 the output current Iout flowing in the path A reaches a maximum, it is possible to stabilize the output voltages VoutA and VoutB (and the gate voltages AGH and BGH of the transistors 111 and 121) in a short time, accordingly, it becomes possible to smoothly perform the switching from the output high impedance state to the linear drive state.

Here, in FIG. 3, the structure is described as an example, in which the driver circuits 11 and 12 are switched to the output high impedance state at the time point (time t12) when both of the PWM signals PWMA and PWMB go to the high level; however, the structure of the present invention is not limited to this, and a structure may be employed, in which the driver circuits 11 and 12 are switched to the output high impedance state at the time point (time t9) when both of the PWM signals PWMA and PWMB go to the low level.

Besides, according to the structure in which the driver circuits 11 and 12 are switched from the PWM drive state to the linear drive state via the output high impedance state (A→Z→L), it becomes possible to prevent a through-current (and an unnecessary energy loss) in the driver circuits 11 and 12 compared with the structure in which the driver circuits 11 and 12 are directly switched from the PWM drive state to the linear drive state.

Especially, according to the structure in which the driver circuits 11 and 12 are switched to the linear drive state after confirming that all of the output transistors (111, 112, 121, 122) are turned off, it is possible to surely prevent a through-current in the driver circuits 11 and 12.

Here, in the motor drive device 10 in the present structural example, the output voltages VoutA and VoutB are monitored to confirm that all of the output transistors (111, 112, 121, 122) are turned off; however, the structure of the present invention is not limited to this, and for example, a structure may be employed, in which the gate voltages (AGH, AGL, BGH, BGL) are monitored.

Besides, in FIG. 3, the case is described as an example, in which the output current Iout flows from the driver circuit 11 to the driver circuit 12 via the motor 20; however, to the contrary, in a case as well where the output current Iout flows from the driver circuit 12 to the driver circuit 11 via the motor 20, in the same operation as in the above description, the switching operation from the PWM drive state to the linear drive state is suitably performed.

Figure 4:
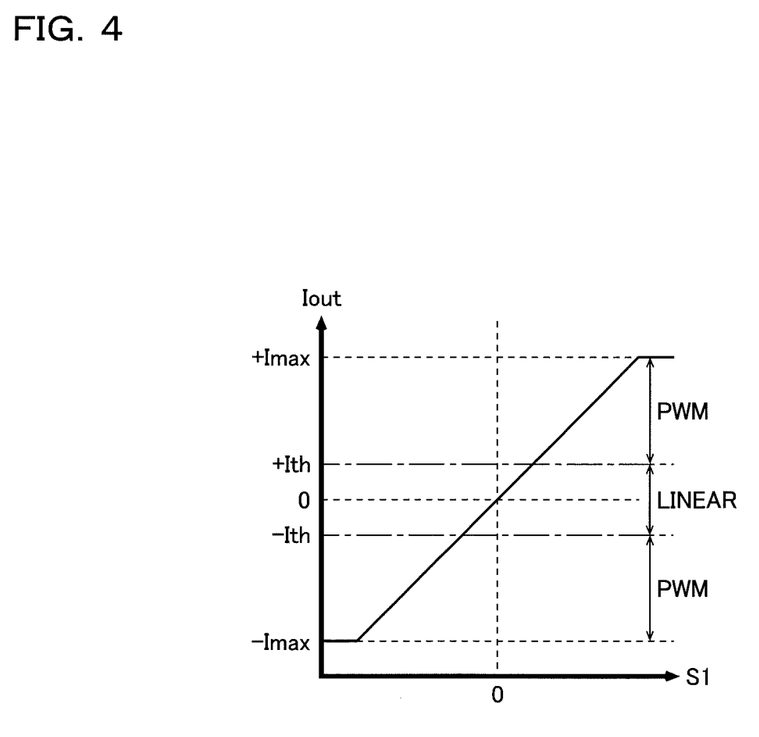
FIG. 4 is a view showing a relationship between a motor control signal S1 and the output current Iout.

FIG. 4 is a view showing a relationship between the motor control signal S1 and the output current Iout. As shown in FIG. 4, the control circuit 17 switches the driver circuits 11 and 12 to the PWM drive state in a large-current region where the output current Iout is larger than a predetermined value (+Ith/−Ith), while switches the driver circuits 11 and 12 to the linear drive state in a small-current region where the output current Iout is smaller than the predetermined value (+Ith/−Ith). According to such structure, it becomes possible to reduce the power loss in the large-current region by means of the PWM drive system and improve the drive accuracy in the small-current region by means of the linear drive system.

Here, in FIG. 1, the structure is described as an example, in which the external enable signal EN1 and the motor control signal S1 are input from outside as signals in separate systems; however, the structure of the present invention is not limited to this, and a signal corresponding to the external enable signal EN1 may be internally generated in accordance with the digital value of the motor control signal S1.

Figure 5:
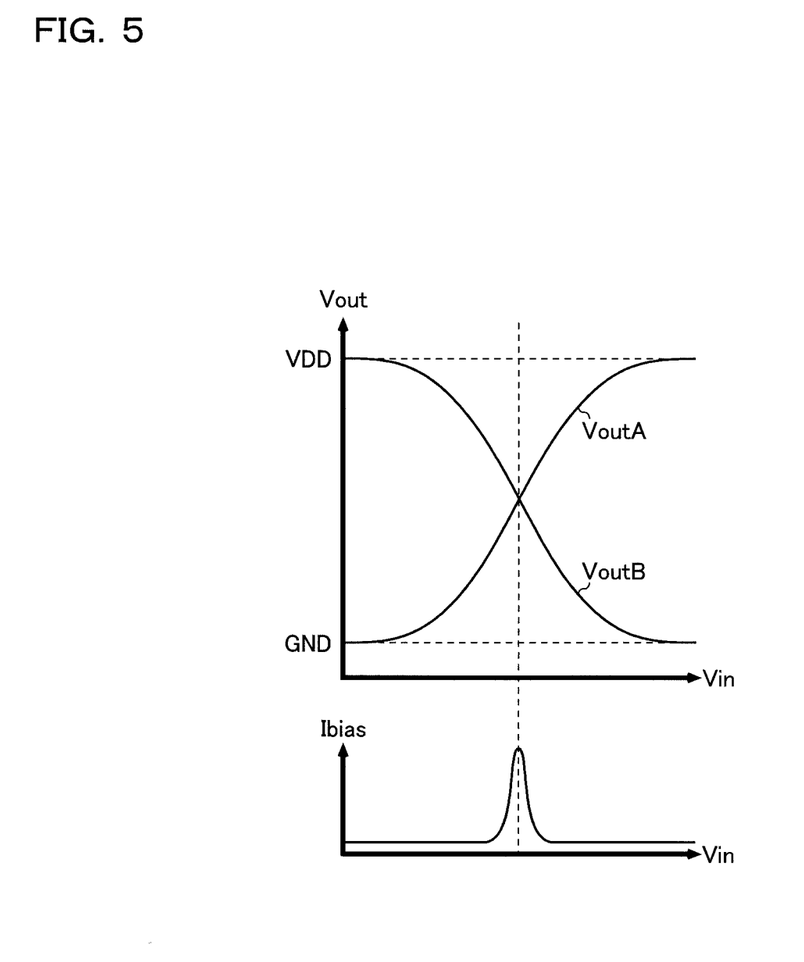
FIG. 5 is an output characteristic view of linear drivers 113 and 123.

FIG. 5 is an output characteristic view of the linear drivers 113 and 123. As shown in FIG. 5, during the time the driver circuits 11 and 12 are in the linear drive state, the linear drivers 113 and 123 generate the gate voltages (AGH, AGL, BGH, BGL) such that a bias current Ibias flows in the motor 20 in a region where the voltage (=|VoutA−VoutB|) across both ends of the motor 20 is smaller than a predetermined value. According to such structure, it is possible to prevent a dead zone of the motor 20.

<Application to Hard Disk Drive>

Figure 6:
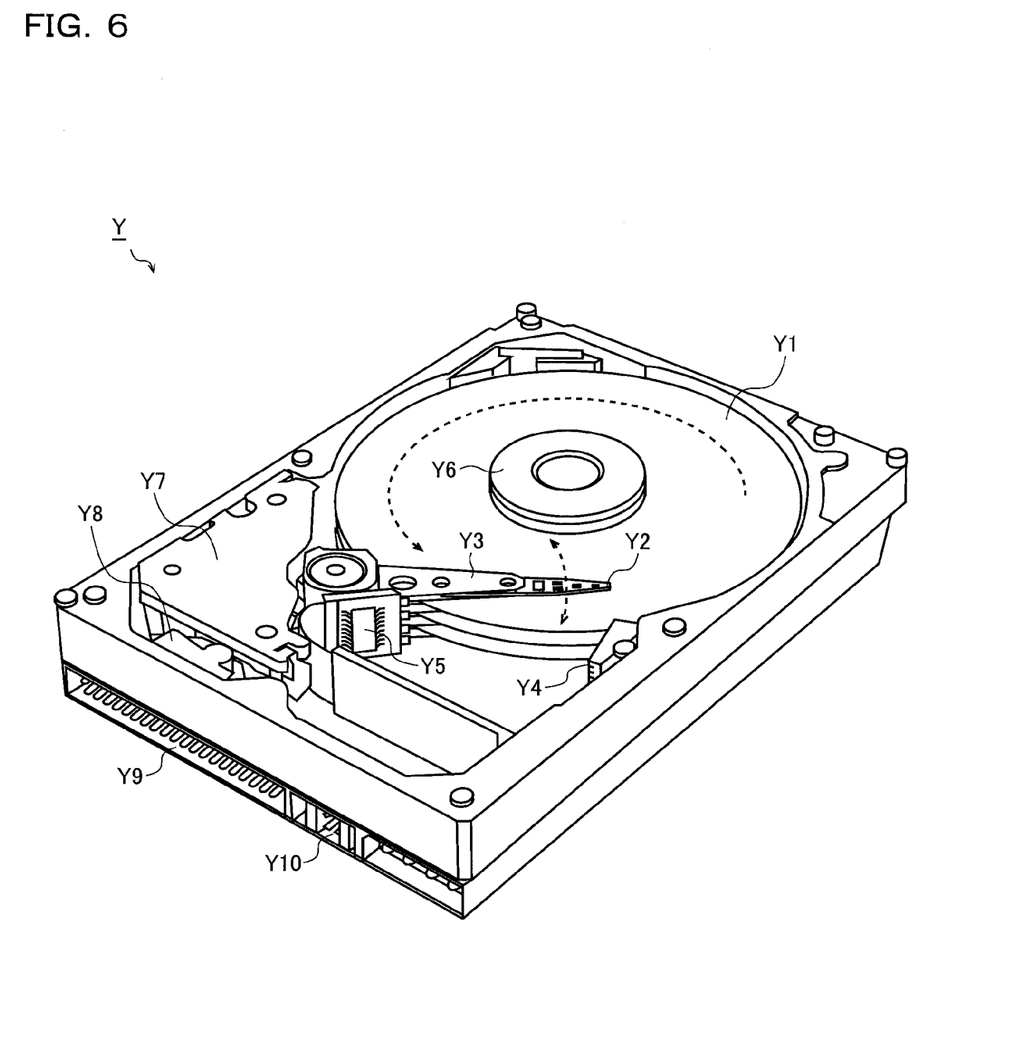
FIG. 6 is a perspective view showing a structural example of a hard disk drive that incorporates a motor drive device.

FIG. 6 is a perspective view (with a top cover removed) showing a structural example of a hard disk drive that incorporates the motor drive device. A hard disk drive Y in the present structural example is a kind of magnetic disk storage device and has: a platter Y1; a magnetic head Y2; a swing arm Y3; a lamp mechanism Y4; a head amplifier Y5; a spindle motor Y6; a voice coil motor Y7; a latch mechanism Y8; an interface connector Y9; and a jumper switch Y10.

The platter Y1 is a magnetic disk that is formed by laminating a magnetic layer on a surface of an aluminum board or a glass board. One hard disk drive Y incorporates one to four platters Y1.

The magnetic head Y2 reads and writes data to and from the platter Y1.

The swing arm Y3 holds the magnetic head Y2 at a tip end thereof.

The lamp mechanism Y4 is an evacuation place for the magnetic head Y2 during a time the platter Y1 does not rotate, and is disposed further outside an outermost circumference of the platter Y1.

The head amplifier Y5 amplifies a regenerative signal obtained by the magnetic head Y2.

The spindle motor Y6 rotates the platter Y1 at predetermined rotation speeds (4200 rpm, 5400 rpm, 7200 rpm, 10000 rpm, 15000 rpm and the like).

The voice coil motor Y7 moves the swing arm Y3 in an arc, thereby moving the magnetic head Y2 in a radial direction of the platter Y1. Here, the motor drive device 10 in FIG. 1 is incorporated as a means for driving the voice coil motor Y7 into the hard disk drive Y.

The latch mechanism Y8 holds the swing arm Y3 during a time the hard disk drive Y is stopped.

The interface connector Y9 is connected to a host interface circuit, which is mounted on a mother board of a personal computer and the like, over a cable.

The jumper switch Y10 is a switch for performing the machine setting (master/slave and the like) of the hard disk drive Y by means of a jumper pin when connecting a plurality of the hard disk drives to one personal computer.

Here, though not shown in FIG. 6, the hard disk drive Y is provided with a printed board on which various electronic circuits are mounted.

<Application to Desktop Personal Computer>

Figure 7:
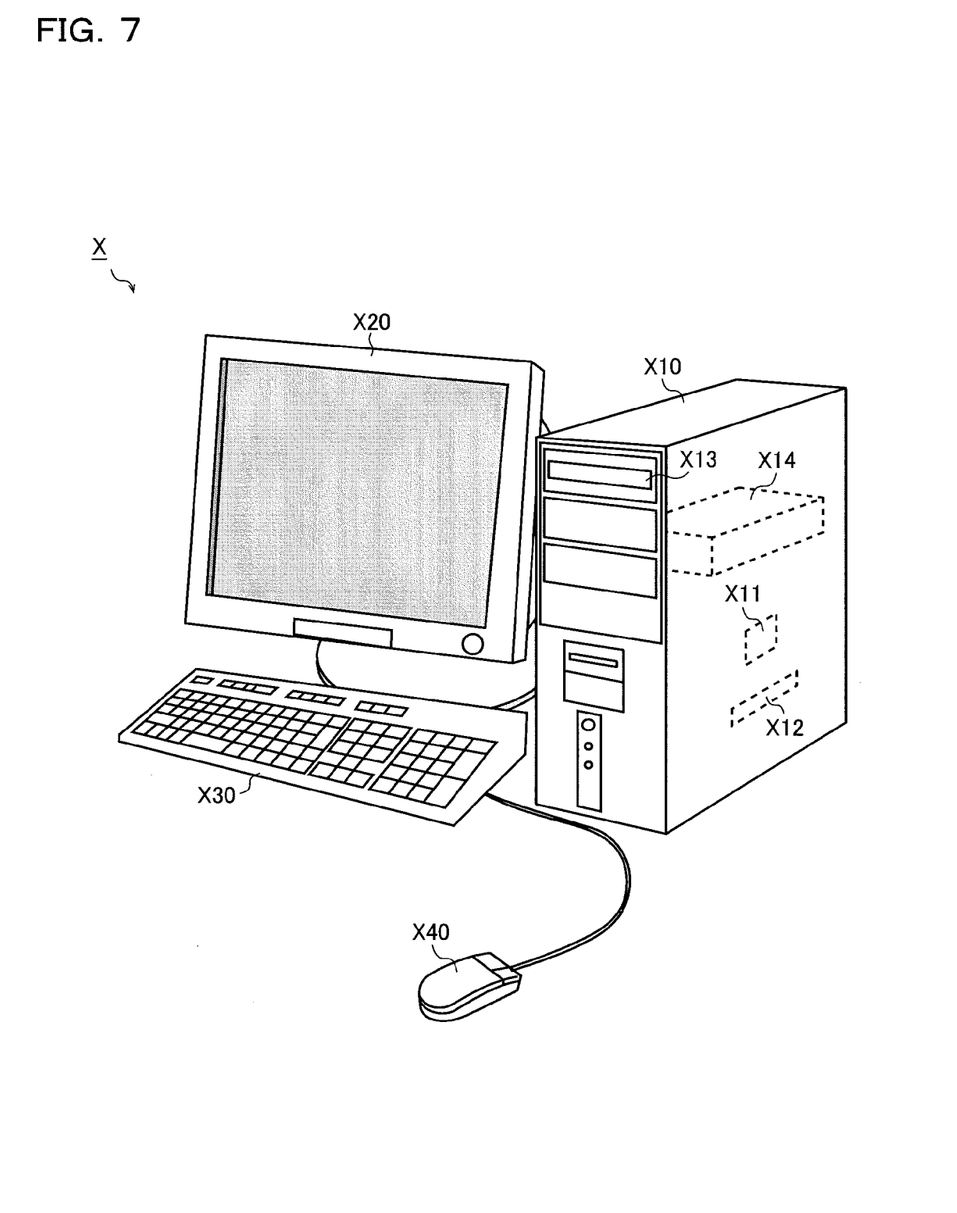
FIG. 7 is an appearance view showing a structural example of a personal computer that incorporates a hard disk drive.

FIG. 7 is an appearance view showing a structural example of a desktop personal computer that incorporates the hard disk drive. A desktop personal computer X in the present structural example has: a main body case X10; a liquid crystal monitor X20; a keyboard X30; and a mouse X40.

The main body case X10 houses: a central processing unit X11; a memory X12; an optical drive X13; a hard disk drive X14 and the like.

The central processing unit X11 executes an operating system and various application programs stored in the hard disk drive X14, thereby controlling comprehensively operation of the desktop personal computer X.

The memory X12 is used as a working region (e.g., a region for storing task data when executing a program) for the central processing unit X11.

The optical drive X13 performs reading/writing of data to and from an optical disk. As the optical disk, there are a CD [compact disk], a DVD [digital versatile disc], a BD [Blu-ray disc] and the like.

The hard disk drive X14 (corresponding to the hard disk drive Y in FIG. 6) is a large-capacity auxiliary storage device that stores the programs and data in a non-volatile way by means of a magnetic disk sealed tightly in the housing.

The liquid crystal monitor X20 outputs an image based on an instruction from the central processing unit X11.

The keyboard X30 and the mouse X40 are each a human interface device that accepts operation by a user.

INDUSTRIAL APPLICABILITY

The technology disclosed in the present specification is preferably usable as a technology for improving, for example, energy efficiency of a motor drive device that drives a voice coil motor.

<Other Modifications>

Here, in the above embodiments, the structure is described as an example, in which the present invention is applied to a desktop personal computer that incorporates a hard disk drive; however, the application target of the present invention is not limited to this, and the present invention is generally applicable, for example, to various electronic appliances (note personal computers, tablet personal computers, hard disk recorders, audio players, game machines and the like) that incorporate a hard disk drive.

Besides, in the above embodiments, the structure is described as an example, in which the present invention is applied to a motor drive device that drives a voice coil motor for a hard disk drive; however, the application target of the present invention is not limited to this, and the present invention is generally applicable to motor drive devices of hybrid type irrespective of the kind and use of motors (inclusive of actuators) that are application targets.

Besides, in addition to the above embodiments, it is possible to add various modifications to the various technical features disclosed in the present specification without departing the spirit of the technological creation. In other words, it should be understood that the above embodiments are examples in all respects and are not limiting; the technological scope of the present invention is not indicated by the above description of the embodiments but by the claims; and all modifications within the scope of the claims and the meaning equivalent to the claims are covered.

LIST OF REFERENCE NUMERALS 10 motor drive device
11, 12 driver circuits
111, 121 output transistors (upper side)
112, 122 output transistors (lower side)
113, 123 linear drivers
114, 115, 124, 125 pre-drivers
13 sense resistor
14 output feedback circuit
141 differential amplifier
142 digital/analog converter
143 error amplifier
144a to 144g resistors
15 PWM signal generation circuit
151 oscillator
152, 153 comparators
16 output voltage monitor circuit
161, 162 comparators
17 control circuit
20 motor
21 coil
22 resistor component
X desktop personal computer
X10 main body case
X11 central processing unit
X12 memory
X13 optical drive
X14 hard disk drive
X20 liquid crystal monitor
X30 keyboard
X40 mouse
Y hard disk drive
Y1 platter (magnetic disk)
Y2 magnetic head
Y3 swing arm
Y4 lamp mechanism
Y5 head amplifier Y6 spindle motor
Y7 voice coil motor
Y8 latch mechanism
Y9 interface connector
Y10 jumper switch

What is claimed is:

1. A motor drive device comprising:
a driver circuit that generates an output current for the motor; and
a control circuit that controls the driver circuit; wherein
the control circuit, when switching the driver circuit from a PWM drive state to a linear drive state, controls timing of the switching such that a path of the output current does not change before and after the switching, and during the switching, switches temporarily the driver circuit to an output high impedance state.

2. The motor drive device according to claim 1, wherein
the control circuit switches the driver circuit from the PWM drive state to the output high impedance state; thereafter, confirms that all of output transistors of the driver circuit are turned off and switches the driver circuit from the output high impedance state to the linear drive state.

3. The motor drive device according to claim 2, further comprising:
an output voltage monitor circuit that monitors an output voltage applied to the motor; wherein
the control circuit confirms based on an output signal from the output voltage monitor circuit that all of the output transistors of the driver circuit are turned off.

4. The motor drive device according to claim 1, further comprising:
a sense resistor that is connected in series with the motor;
an output feedback circuit that generates a feedback voltage from a voltage across both ends of the sense resistor; and
a PWM signal generation circuit that compares the feedback voltage and a slope voltage with each other to generate a PWM signal; wherein
the control circuit applies PWM driving to the driver circuit based on the PWM signal.

5. The motor drive device according to claim 4, wherein
the driver circuit includes:
a linear driver that continuously changes a gate voltage of the output transistor based on the feedback voltage; and
a pre-driver that switches periodically the gate voltage of the output transistor to a high level or a low level based on an instruction from the control circuit when bringing the driver circuit to a PWM drive state, and is disconnected from the gate of the output transistor when bringing the driver circuit to a linear drive state.

6. The motor drive device according to claim 5, wherein
the control circuit, when bringing the driver circuit to the output high impedance state, controls the pre-driver such that all of the transistors included in the driver circuit are turned off.

7. The motor drive device according to claim 6, wherein
the PWM signal generation circuit includes:
an oscillator that generates the slope voltage and an inverted slope voltage obtained by inverting the slope voltage;
a first comparator that compares the feedback voltage and the slope voltage with each other to generate a first PWM signal; and
a second comparator that compares the feedback voltage and the inverted slope voltage with each other to generate a second PWM signal.

8. The motor drive device according to claim 7, wherein
The control circuit, during a time of keeping the driver circuit at the PWM drive state, controls the pre-driver based on the first PWM signal and the second PWM signal to switch the path in which the output current flows.

9. The motor drive device according to claim 8, wherein
the control circuit, during the time of keeping the driver circuit at the PWM drive state, controls the driver circuit to flow the output current in a path that extends from an application terminal of a power supply voltage to an application terminal of a ground voltage via the motor when logic levels of the first PWM signal and the second PWM signal are different from each other; and when the logic levels of the first PWM signal and the second PWM signal are equal to each other, controls the driver circuit to flow the output current in a path that extends from the application terminal of the power supply voltage to the application terminal of the power supply voltage via the motor or in a path that extends from the application terminal of the ground voltage to the application terminal of the ground voltage via the motor.

10. The motor drive device according to claim 9, wherein
the control circuit, when switching the driver circuit from the PWM drive state to the output high impedance state, uses a time point, when the logic levels of the first PWM signal and the second PWM signal are equal to each other, as a switch timing.

11. The motor drive device according to claim 5, wherein
the linear driver, during a time the driver circuit is in the linear drive state, generates the gate voltage of the output transistor such that a bias current flows in the motor in a region where a voltage across both ends of the motor is smaller than a predetermined value.

12. The motor drive device according to claim 4, wherein
the output feedback circuit includes:
a differential amplifier that generates a first voltage by amplifying the voltage across both ends of the sense resistor;
a digital/analog converter that generates a second voltage from a digital motor control signal; and
an error amplifier that generates the feedback voltage by amplifying a difference between a third voltage decided based on both of the first voltage and the second voltage and a predetermined reference voltage.

13. The motor drive device according to claim 1, wherein
the control circuit switches the driver circuit to the PWM drive state in a large current region where the output current is larger than a predetermined value, and switches the driver circuit to the linear drive state in a small current region where the output current is smaller than the predetermined value.

* * * * *